US009571811B2

(12) United States Patent
D'Amato et al.

(10) Patent No.: US 9,571,811 B2
(45) Date of Patent: *Feb. 14, 2017

(54) METHOD AND DEVICE FOR MULTIPLEXING AND DEMULTIPLEXING COMPOSITE IMAGES RELATING TO A THREE-DIMENSIONAL CONTENT

(71) Applicant: S.I.SV.EL SOCIETA' ITALIANA PER LO SVILUPPO DELL'ELETTRONICA S.P.A.

(72) Inventors: Paolo D'Amato, Rome (IT); Dario Pennisi, Fiumicino (IT); Giovanni Ballocca, Turin (IT)

(73) Assignee: S.I.SV.EL. SOCIETA' ITALIANA PER LO SVILUPPO DELL'ELETTRONICA S.P.A., None (TO) (IT)

( * ) Notice: Subject to any disclaimer, the term of this patent is extended or adjusted under 35 U.S.C. 154(b) by 395 days.

This patent is subject to a terminal disclaimer.

(21) Appl. No.: 13/834,498

(22) Filed: Mar. 15, 2013

(65) Prior Publication Data

US 2013/0229487 A1 Sep. 5, 2013

Related U.S. Application Data

(63) Continuation-in-part of application No. 13/812,065, filed as application No. PCT/IB2011/053361 on Jul. 28, 2011.

(30) Foreign Application Priority Data

Jul. 28, 2010 (IT) .............................. TO2010A0652

(51) Int. Cl.
H04N 13/00 (2006.01)

(52) U.S. Cl.
CPC ........ *H04N 13/004* (2013.01); *H04N 13/0048* (2013.01); *H04N 2213/003* (2013.01); *H04N 2213/005* (2013.01)

(58) Field of Classification Search
CPC .................................... G06T 3/40; H04N 7/56
See application file for complete search history.

(56) References Cited

U.S. PATENT DOCUMENTS 4,471,349 A * 9/1984 Strolle ........................... 345/657
5,691,768 A * 11/1997 Civanlar .................... G06T 3/40
375/240.01

(Continued)

FOREIGN PATENT DOCUMENTS

EP 1 705 929 A1 9/2006
EP 2 157 803 A1 2/2010

(Continued)

OTHER PUBLICATIONS

*High-Definition Multimedia Interface, Specification Version 1.4a, Extraction of 3D Signaling Portion*, Mar. 4, 2010, 28 pages.

(Continued)

*Primary Examiner* — Richard Torrente
*Assistant Examiner* — Shadan E Haghani
(74) *Attorney, Agent, or Firm* — Workman Nydegger

(57) ABSTRACT

A method for generating a stereoscopic video stream includes composite images having pixels related to a right and a left image of a tridimensional video content; the pixels of the right and left images are inserted into a composite image of the stereoscopic video stream, all the pixels of the right and left images are inserted in the composite image by leaving one of said two images unaltered and breaking up the other one into regions including a plurality of pixels and entering the regions into the composite image; the composite image has larger dimensions than those necessary to allow (Continued)

the insertion of all pixels of the left and right images, and in the pixels of the composite image left after such insertion a depth map is inserted, whose elements correspond to the pixel depth of the tridimensional content.

40 Claims, 10 Drawing Sheets

(56) References Cited

U.S. PATENT DOCUMENTS

| | | | |
|---|---|---|---|
| 5,848,198 A * | 12/1998 | Penn | 382/276 |
| 5,870,097 A * | 2/1999 | Snyder et al. | 345/426 |
| 7,245,768 B1 | 7/2007 | Harman et al. | |
| 2003/0198290 A1 | 10/2003 | Millin | |
| 2004/0101043 A1 | 5/2004 | Flack et al. | |
| 2005/0012757 A1* | 1/2005 | Park et al. | 345/582 |
| 2005/0041736 A1 | 2/2005 | Butler-Smith et al. | |
| 2007/0024614 A1 | 2/2007 | Tam et al. | |
| 2009/0015662 A1 | 1/2009 | Kim et al. | |
| 2010/0188572 A1 | 7/2010 | Card, II | |
| 2010/0238267 A1 | 9/2010 | Izzat et al. | |
| 2010/0289871 A1* | 11/2010 | Tatsuta | H04N 13/0059 348/42 |
| 2010/0321479 A1* | 12/2010 | Yang | H04N 13/0051 348/51 |
| 2010/0329358 A1 | 12/2010 | Zhang et al. | |
| 2011/0032333 A1* | 2/2011 | Neuman | H04N 13/007 348/43 |
| 2011/0074924 A1* | 3/2011 | Barenbrug | H04N 13/0029 348/43 |
| 2011/0074934 A1* | 3/2011 | Ko | H04N 13/0003 348/51 |
| 2011/0122131 A1 | 5/2011 | Bruls et al. | |
| 2011/0122225 A1 | 5/2011 | Kim et al. | |
| 2011/0134214 A1* | 6/2011 | Chen | H04N 19/597 348/43 |
| 2011/0149034 A1 | 6/2011 | Tsukagoshi | |
| 2011/0158604 A1* | 6/2011 | Sasaki et al. | 386/239 |
| 2011/0175988 A1 | 7/2011 | Luthra et al. | |
| 2011/0193860 A1 | 8/2011 | Lee et al. | |
| 2011/0210969 A1 | 9/2011 | Barenbrug | |
| 2011/0242279 A1 | 10/2011 | Redert | |
| 2011/0273437 A1 | 11/2011 | Sanderson et al. | |
| 2011/0304691 A1 | 12/2011 | Newton et al. | |
| 2012/0051625 A1 | 3/2012 | Appia | |
| 2012/0069154 A1* | 3/2012 | Talstra | H04N 13/0048 348/51 |
| 2012/0092454 A1 | 4/2012 | Tourapis et al. | |
| 2012/0120192 A1 | 5/2012 | Alregib | |
| 2013/0033586 A1 | 2/2013 | Hulyalkar | |
| 2013/0201283 A1 | 8/2013 | Broberg et al. | |

FOREIGN PATENT DOCUMENTS

| | | |
|---|---|---|
| JP | 2011-030183 | 2/2011 |
| TW | 200935873 | 8/2009 |
| WO | 2008/038205 A2 | 4/2008 |
| WO | 2010/064118 A1 | 6/2010 |

OTHER PUBLICATIONS

*Blu-ray Disc, White Paper Blue-ray Disc Format, 2.8 Audio Visual Application*, Apr. 2010, 3 pages.
International Search Report dated Nov. 18, 2011 issued in PCT Application No. PCT/IB2011/053361, filed Jul. 28, 2011.
Written Opinion dated Nov. 18, 2011 issued in PCT Application No. PCT/IB2011/053361, filed Jul. 28, 2011.
Final Office Action dated Sep. 29, 2015, issued in U.S. Appl. No. 13/812,065, filed Feb. 1, 2013.
Office Action dated Apr. 15, 2015, issued in U.S. Appl. No. 13/812,065, filed Feb. 1, 2013.

* cited by examiner

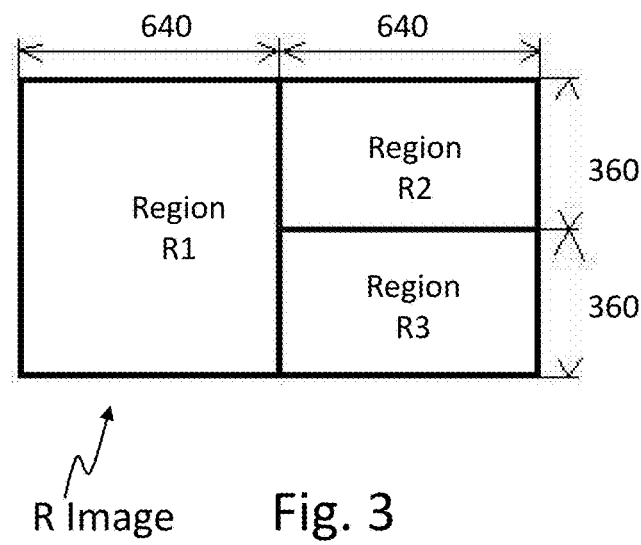
R Image  Fig. 3
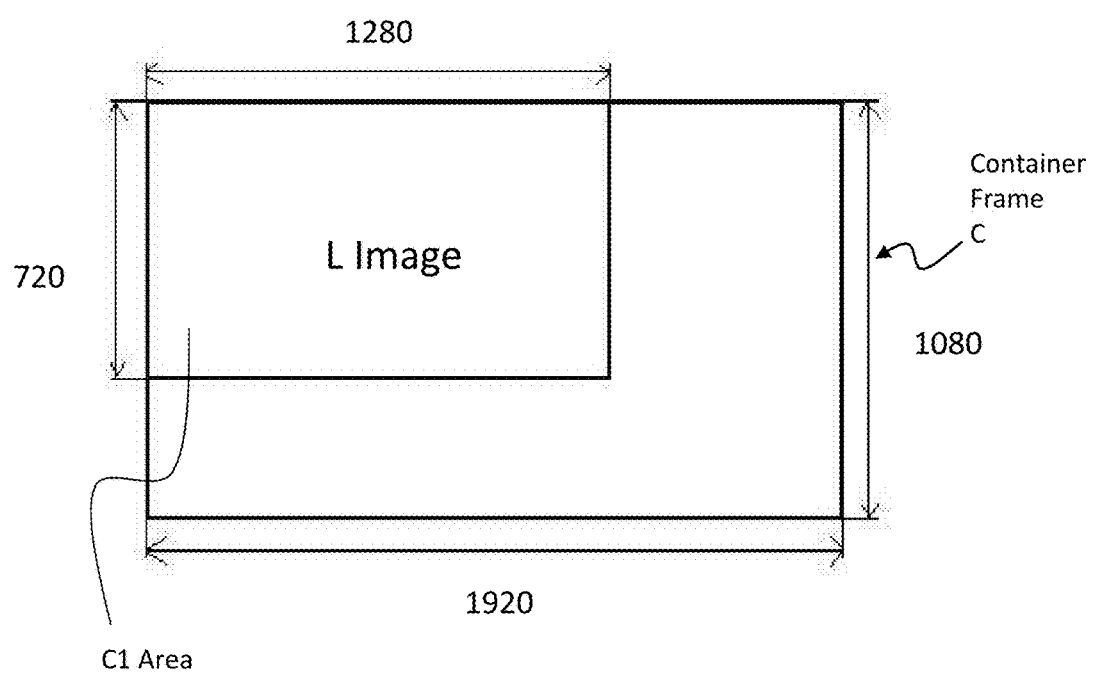
Fig. 4

METHOD AND DEVICE FOR MULTIPLEXING AND DEMULTIPLEXING COMPOSITE IMAGES RELATING TO A THREE-DIMENSIONAL CONTENT

CROSS-REFERENCE TO RELATED APPLICATIONS

This application is a continuation-in-part of U.S. application Ser. No. 13/812,065, filed Feb. 1, 2013, which is a US nationalization of PCT Application No. PCT/IB2011/053361, filed Jul. 28, 2011, which claims priority to Italian Application No. TO2010A000652, filed Jul. 28, 2010 and which applications are incorporated herein by specific reference.

TECHNICAL FIELD

The present invention relates to methods and devices for multiplexing and demultiplexing, within a stereoscopic transport system two image sequences and a depth map sequence.

OBJECTS AND BRIEF DESCRIPTION OF THE INVENTION

The object of the present invention is to provide a method and a device for combining two image sequences and a depth map sequence in a stereoscopic video stream.

These and other objects of the present invention are achieved through a method and a system for multiplexing and demultiplexing images transported by a stereoscopic video stream incorporating the features set out in the appended claims, which are intended as an integral part of the present description.

The general idea at the basis of the present invention is to generate a stereoscopic stream by inserting a depth map into a composite image being a frame of a stereoscopic video stream. The depth map has a lower resolution, and therefore a smaller number of pixels, than that of the stereoscopic pair, thus limiting bandwidth occupation.

In a preferred embodiment, the frame carries a composite image that comprises a right image, a left image and the depth map, appropriately multiplexed.

The right and left images are arranged in the composite frame in an innovative manner. The frame comprises a number of pixels which is higher than the sum of the pixels of the original format (i.e., prior to coding) of both the right and left images, which are thus entered without being subject to decimation.

The pixels of the first image (e.g., the left image) are entered into the composite image without undergoing any changes, whereas the second image is subdivided into regions whose pixels are arranged in free areas of the composite image.

This solution offers the advantage that one of the two images is left unchanged, which results in better quality of the reconstructed image.

Advantageously, the second image is then broken up into the smallest possible number of regions, so as to maximize the spatial correlation among the pixels and reduce the generation of artifacts during the compression step.

In an advantageous embodiment, the regions of the second image are entered into the composite image by means of translation or rototranslation operations only, thus leaving unchanged the ratio between horizontal and vertical resolution.

In a further embodiment, at least one of the regions into which the second image has been broken up undergoes a specular inversion step, i.e., it is overturned relative to one axis (in particular one side) and is arranged in the composite image in a manner such that one of its sides borders on one side of the other image having identical or similar pixels on the bordering side due to the strong correlation existing between homologous pixels of the two right and left images, i.e., pixels of the two images which are positioned in the same row and column.

This solution offers the advantage of reducing the generation of artifacts in the boundary area. More advantageously, the regions into which the second image is subdivided have a rectangular shape; compared to the solution that uses triangular regions arranged with boundary areas crossing the composite image in diagonal directions, this choice provides a reduction of the artifacts produced by a subsequent compression step, especially if the latter acts upon square blocks of pixels (e.g., 16×16 for the H.264 standard).

According to a particularly advantageous embodiment, the formation of artifacts is further reduced or even completely eliminated by introducing redundancy in the composite image, i.e., by copying some groups of pixels several times. In particular, this is attained by breaking up the basic image to be entered into the composite image into regions having such dimensions that the total number of pixels of these regions exceeds the number of pixels of the image to be broken up. In other words, the image is broken up into regions, of which at least two comprise an image portion in common. The common image portion is a boundary area between regions adjacent to each other in the disassembled image. The size of this common portion preferably depends on the type of compression to be subsequently applied to the composite image, and may act as a buffer area which will be partially or completely removed when the disassembled image is reconstructed. Since compression may introduce artifacts in the boundary areas of said regions, by eliminating the buffer areas, or at least the outermost part thereof, it is possible to eliminate any artifacts and reconstruct an image which is faithful to the original one.

According to an aspect of the invention, it is provided a method for generating a stereoscopic video stream comprising composite images, said composite images comprising pixels related to a right image and a left image of a tridimensional video content, the pixels of said right image and the pixels of said left image being inserted into a composite image of said stereoscopic video stream, wherein all the pixels of said right image and all the pixels of said left image are inserted in said composite image by leaving one of said two images unaltered and breaking up the other one into regions and entering said regions into said composite image, wherein said composite image has larger dimensions than those necessary to allow the insertion of all pixels of said left and right images, and wherein, in the pixels of the composite image left after such insertion, a depth map is inserted, whose elements correspond to the pixel depth of said tridimensional content.

According to another aspect of the invention, it is provided a method for reconstructing a pair of left and right images and a depth map by starting from a composite image, comprising the steps of:

generating a first one of said right and left images by copying all the pixels of one first region of said composite image, generating a second image of said right and left images by copying all the pixels of other regions of said composite image, and generating a depth map copying the pixels of a further region of said composite image.

According to another aspect of the invention, it is provided a device for generating a stereoscopic video stream comprising composite images, said composite images comprising pixels related to a right image and a left image of a tridimensional video content, the pixels of said right image and the pixels of said left image being inserted into a composite image of said stereoscopic video stream, wherein it comprises a first processing unit:

inserting all the pixels of said right image and all the pixels of said left image in said composite image by leaving one of said two images unaltered and breaking up the other one into regions, and entering said regions into said composite image, wherein said composite image has larger dimensions than those necessary to allow the insertion of all pixels of said left and right images, and inserting, in the pixels of the composite image left after said insertion of the right and left image, a depth map, whose elements correspond to the pixel depth of said tridimensional content.

According to still another aspect of the invention, it is provided a device for reconstructing a pair of left and right images and a depth map by starting from a composite image, wherein it comprises a second processing unit:

generating a first one of said right and left images by copying all the pixels of one first region of said composite image, generating a second image of said right and left images by copying all the pixels of other regions of said composite image, and generating a depth map copying the pixels of a further region of said composite image.

Further objects and advantages of the present invention will become more apparent from the following description of a few embodiments thereof, which are supplied by way of non-limiting example.

BRIEF DESCRIPTION OF THE DRAWINGS

Said embodiments will be described with reference to the annexed drawings, wherein:

FIG. 3 shows a first form of disassembly of an image to be entered into a composite image;

FIG. 4 shows a first step of constructing a composite image according to one embodiment of the present invention;

Where appropriate, similar structures, components, materials and/or elements are designated by means of similar references in different figures.

DETAILED DESCRIPTION OF THE INVENTION

Figure 1:
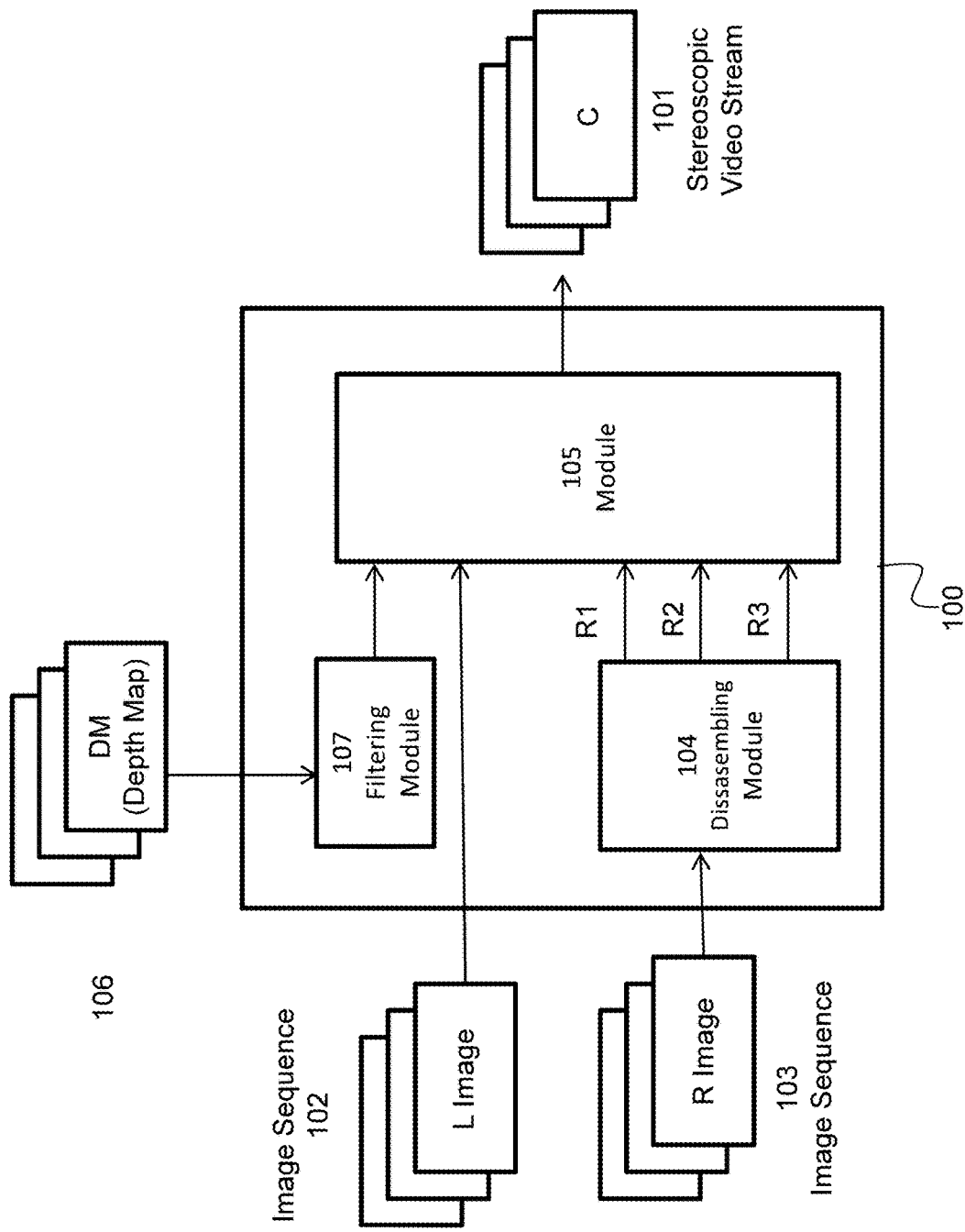
FIG. 1 shows a block diagram of a device for multiplexing the right image and the left image into a composite image.

FIG. 1 shows a block diagram of a device 100 for generating a stereoscopic video stream 101 with a depth map for superimposing images on a video content transported by the video stream.

For the purposes of the present invention, a three-dimensional (or 3D) content is an image or a video which is perceived by the observer as having variable depth, where elements can protrude from the screen plane on which said image or video is being displayed or projected.

The depth of a three-dimensional content relates to the dimension of the three-dimensional content which enters into the screen along an axis orthogonal to the screen on which the 3D content is being displayed. For the purposes of the present description, the screen corresponds to a zero depth point, while the "minimum depth" point is that point of the 3D content which is perceived by the user as closest to him/herself, i.e., farthest from the screen. Accordingly, the "maximum depth" point is that point which is perceived by the observer as deepest into the screen, i.e., farthest from him/herself, even beyond the screen plane.

In FIG. 1, the device 100 is inputted two image sequences 102 and 103, e.g., two video streams, respectively intended for the left eye (L) and the right eye (R), and a depth map sequence 106. Each depth map in the sequence 106 is associated with one pair of right and left images belonging to the sequences 102 and 103, respectively. In this embodiment, the depth map is generated by means of per se known algorithms which compare a right image with a left image and return a matrix (the depth map) having a size equal to the pixels of one of the two compared images, and whose elements have a value which is proportional to the depth of each pixel being displayed. Another depth map generation technique is based on measuring the distance of the object in the scene from the pair of video cameras that are shooting the scene: This distance can be easily measured by means of a laser. In the case of artificial video streams generated with the help of electronic computers, the video cameras are virtual ones, in that they consist of two points of view of a certain scene artificially created by a computer.

As an alternative to the example of FIG. 1, the depth maps of the sequence 106 may be generated within the device 100. In this case, the device 100 comprises a suitable module which is inputted the images L and R of the sequences 102 and 103 and then generates corresponding depth maps.

The device 100 allows to implement a method for multiplexing two images of the two sequences 102 and 103 and the depth map of the sequence 106.

In order to implement the method for multiplexing the right and left images and the depth map, the device 100 comprises a disassembler module 104 for breaking up an input image (the right image in the example of FIG. 1) into a plurality of sub-images, each corresponding to one region of the received image, an undersampling and filtering module 107 for processing the depth map, and an assembler module 105 capable of entering the pixels of received images, including the depth map, into a single composite image to be provided at its output. If no processing of the sequence 106 is necessary, the module 107 may be omitted. This may be the case, for example, when the depth map is laser-generated and has, right from the start, a lower resolution than that of the images L and R.

Figure 2:
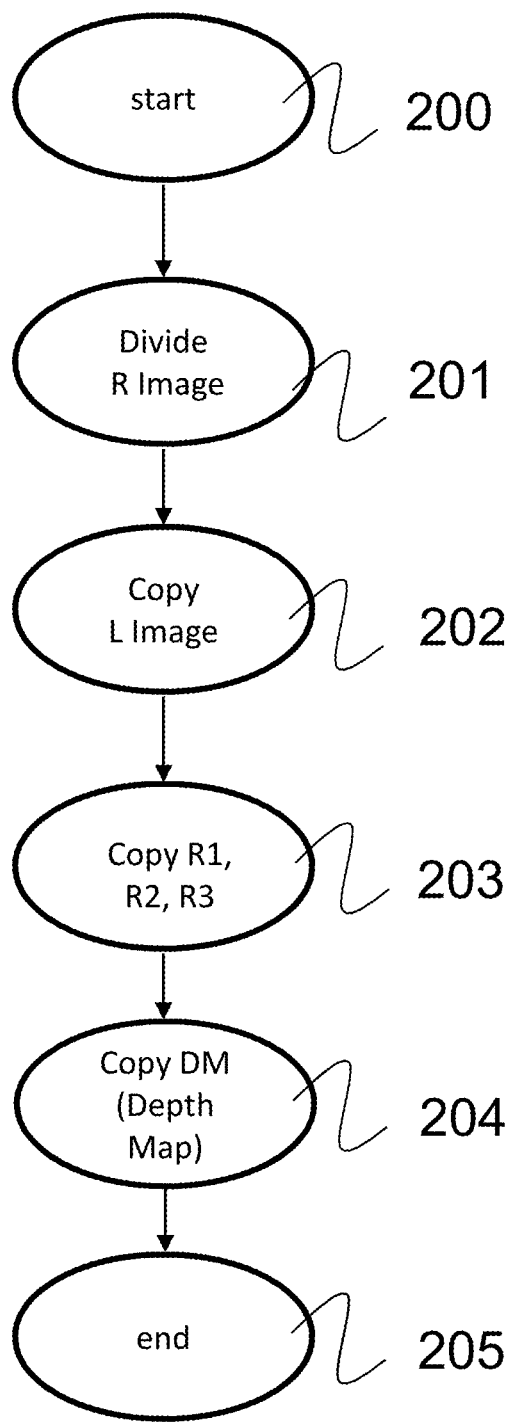
FIG. 2 is a flow chart of a method executed by the device of FIG. 1.

One example of a multiplexing method implemented by the device 100 will now be described with reference to FIG. 2.

The method starts in step 200. Subsequently (step 201), one of the two input images (right or left) is broken up into a plurality of regions, as shown in FIG. 3. In the example of FIG. 3, the disassembled image is a frame R of a video stream 720p, i.e., a progressive format with a resolution of 1280×720 pixels, 25/30 fps (frames per second).

The frame R of FIG. 3 comes from the video stream 103 which carries the images intended for the right eye, and is disassembled into three regions R1, R2 and R3.

The disassembly of the image R is obtained by dividing it into two portions of the same size and subsequently subdividing one of these portions into two portions of the same size.

The region R1 has a size of 640×720 pixels and is obtained by taking all the first 640 pixels of each row. The region R2 has a size of 640×360 pixels and is obtained by taking the pixels from 641 to 1280 of the first 360 rows. The region R3 has a size of 640×360 pixels and is obtained by taking the remaining pixels of the image R, i.e., the pixels from 641 to 1280 of the last 360 rows.

In the example of FIG. 1, the step of disassembling the image R is carried out by the module 104, which receives an input image R (in this case the frame R) and outputs three sub-images (i.e., three groups of pixels) corresponding to the three regions R1, R2 and R3.

Subsequently (steps 202, 203 and 204) the composite image C is constructed, which comprises the information pertaining to both the right and the left images and to the depth map received; in the example described herein, said composite image C is a frame of the output stereoscopic video stream, and therefore it is also referred to as container frame.

First of all (step 202), the input image received by the device 100 and not disassembled by the device 105 (the left image L in the example of FIG. 1) is entered unchanged into a container frame which is sized in a manner such as to include all the pixels of both input images. For example, if the input images have a size of 1280×720 pixels, then a container frame suitable for containing both will be a frame of 1920×1080 pixels, e.g., a frame of a video stream of the 1080p type (progressive format with 1920×1080 pixels, 25/30 frames per second).

In the example of FIG. 4, the left image L is entered into the container frame C and positioned in the upper left corner. This is obtained by copying the 1280×720 pixels of the image L into an area C1 consisting of the first 1280 pixels of the first 720 rows of the container frame C.

When in the following description reference is made to entering an image into a frame, or transferring or copying pixels from one frame to another, it is understood that this means to execute a procedure which generates (by using hardware and/or software means) a new frame comprising the same pixels as the source image.

The (software and/or hardware) techniques for reproducing a source image (or a group of pixels of a source image) into a target image are considered to be unimportant for the purposes of the present invention and will not be discussed herein any further, in that they are per se known to those skilled in the art.

In the next step 203, the image disassembled in step 201 by the module 104 is entered into the container frame. This is achieved by the module 105 by copying the pixels of the disassembled image into the container frame C in the areas thereof which were not occupied by the image L, i.e., areas being external to the area C1.

In order to attain the best possible compression and reduce the generation of artifacts when decompressing the video stream, the pixels of the subimages outputted by the module 104 are copied by preserving the respective spatial relations. In other words, the regions R1, R2 and R3 are copied into respective areas of the frame C without undergoing any deformation, exclusively by means of translation and/or rotation operations.

Figure 5:
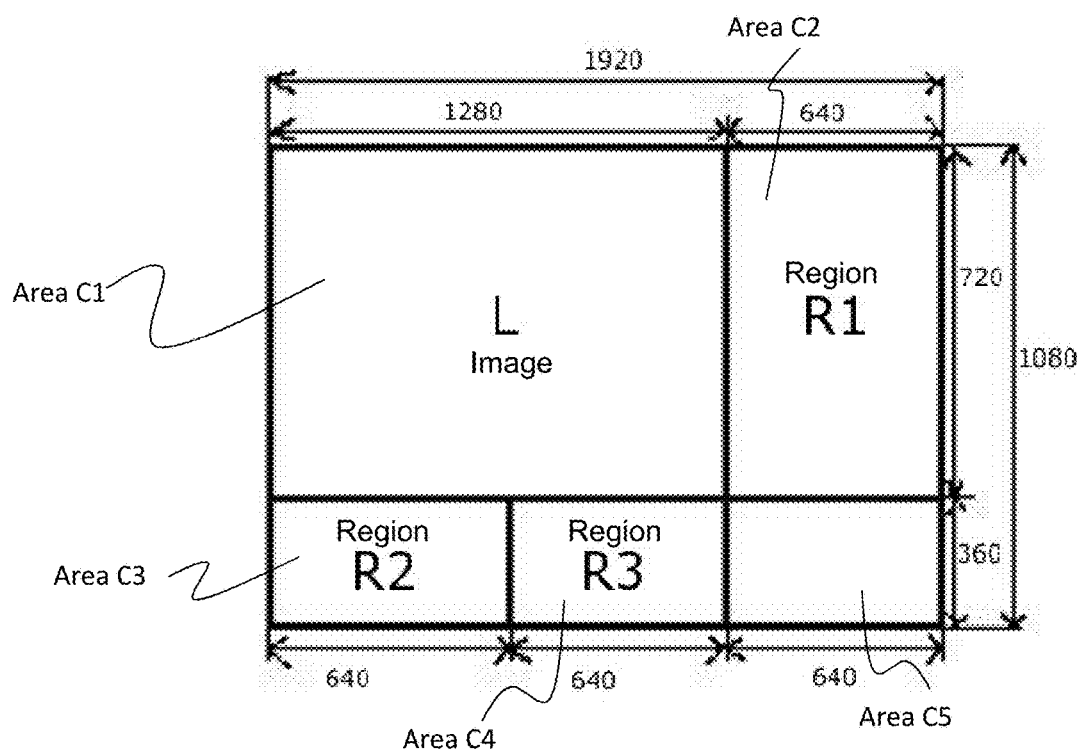
FIG. 5 shows the complete composite image of FIG. 4.

An example of the container frame C outputted by the module 105 is shown in FIG. 5.

The region R1 is copied into the last 640 pixels of the first 720 rows (area C2), i.e., next to the previously copied image L.

The regions R2 and R3 are copied under the area C1, i.e., respectively in the areas C3 and C4, which respectively comprise the first 640 pixels and the following 640 pixels of the last 360 rows.

As an alternative to the solution shown in FIG. 5, the regions R2 and R3 may be copied into the container frame C in disjoined areas (i.e., neither overlapping nor neighbouring) separated by a group of pixels, so as to reduce the boundary regions.

The operations for entering the images L and R into the container frame do not imply any alterations to the balance between horizontal and vertical resolution.

In the free pixels of the frame C, i.e., in the area C5, the module 105 enters, in the form of an image, the depth map (DM) pertaining to the stereoscopic pair L and R (step 204). Prior to step 204, the depth map DM may be undersampled, filtered or further processed by the module 107.

The depth map is preferably coded as a gray scale image, the information content of which can therefore be transported by the luminance signal alone, since chrominances are null; this allows to obtain an effective compression of the container frame C.

As shown in the example of FIG. 5, the depth map entered into the frame C has a resolution lower than that of the pair L and R. The chosen resolution of the depth map is a result of a compromise between the bit rate required for the transfer, which must be as low as possible, and the quality of the information contained in it.

In a preferred embodiment, the depth map DM has a resolution of 640×360 pixels, corresponding to a 4-to-1 undersampling (or decimation) of the original depth map having a resolution of 1280×720 pixels, matching that of the images L and R. Each pixel of the undersampled map DM corresponds to a 2×2 pixel region of the original map. In particular, the 4-to-1 undersampling step can be executed by selecting one row out of two and one column out of two of the original map.

In another embodiment, after decimation the depth map DM undergoes a processing step wherein it is divided into 16×16-pixel macroblocks, and the pixels belonging to the same macroblock are assigned a single depth value. Preferably, this value equals the minimum depth within the macroblock, since this is the most significant value for properly positioning the overlays.

Alternatively, this value is equal to the mean depth value within the macroblock.

The choice of 16×16-pixel macroblocks is particularly advantageous when the compression standard in use is H.264, because such macroblocks coincide with those employed in the H.264 standard. With this solution, in fact, compression generates less artifacts and requires a lower bit rate.

The subdivision into blocks of 8×8 or 4×4 can also be considered to be advantageous in that, due to the particular characteristics of the H.264 compression algorithm, compression benefits are obtained if the pixels within these blocks are all equal.

Alternatively, but giving up the subdivision into blocks or macroblocks within which the pixels are all equal, the 640×360 depth map may be filtered with a two-dimensional low-pass filter. Compression advantages are obtained in this case as well, because the highest spatial frequencies are eliminated or reduced.

Alternatively, the depth map may have a resolution of 160×90 pixels, resulting from a 64-to-1 undersampling, wherein each pixel of the depth map DM corresponds to an 8×8 region of the original map.

In a further embodiment, the depth map DM entered into the container frame C may have an uneven resolution; in particular, the lower half or third of the depth map has a higher resolution than the upper part. This solution turns out to be particularly advantageous as concerns the positioning of subtitles or other information such as the audio volume, which are generally placed in the lower part of the image. The receiver can thus use more accurate information about the depth of the pixels in a region of interest, e.g., the lower third of the 3D image, and can therefore position the images (text or graphics) correctly in that region. At the very least, the depth map may even only contain information about the depth of the pixels (all or only a portion thereof) located in a region of interest, in particular in the lower half or in the lower third of the three-dimensional content.

In another embodiment, a region of the container frame which is not occupied by the right or left images, by portions thereof or by the depth map is intended for receiving a flag which is necessary for reconstructing the right and left images at demultiplexer level. For example, said flag may relate to how the composite image has been created. Preferably, the flag may contain information useful for properly using the depth map.

The pixels of this flag region are, for example, colored in two colors (e.g., black and white) so as to create a bar code of any kind, e.g., linear or two-dimensional, which carries the flag information.

Once the transfer of both images and of the depth map received (and possibly also of the flag) into the container frame has been completed, the method implemented by the device 100 ends, and the container frame can be compressed and transmitted on a communication channel and/or recorded onto a suitable medium (e.g., CD, DVD, Blu-ray, mass memory, etc.).

Since the multiplexing operations explained above do not alter the spatial relations among the pixels of one region or image, the video stream outputted by the device 100 can be compressed to a considerable extent while preserving good possibilities that the image will be reconstructed very faithfully to the transmitted one without creating significant artifacts.

Before describing any further embodiments, it must be pointed out that, in the preferred embodiment, the division of the frame R into three regions R1, R2 and R3 corresponds to the division of the frame into the smallest possible number of regions, taking into account the space available in the composite image and the space occupied by the left image entered unchanged into the container frame.

Said smallest number is, in other words, the minimum number of regions necessary to occupy the space left available in the container frame C by the left image.

In general, therefore, the minimum number of regions into which the image must be disassembled is defined as a function of the format of the source images (right and left images) and of the target composite image (container frame C).

Preferably, the image to be entered into the frame is disassembled by taking into account the need for breaking up the image (e.g., R in the above example) into the smallest number of rectangular regions.

Figure 6:
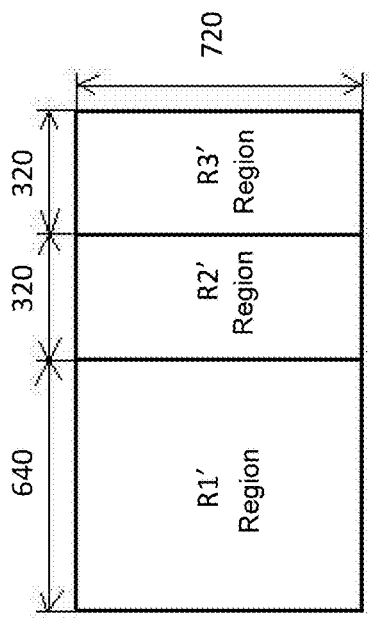
FIG. 6 shows a second form of disassembly of an image to be entered into a composite image.

In a further embodiment, the right image R is disassembled as shown in FIG. 6.

The region R1' corresponds to the region R1 of FIG. 3, and therefore comprises the first 640 pixels of all 720 rows of the image.

The region R2' comprises the 320 columns of pixels adjacent to the region R1', whereas the region R3' comprises the last 320 columns of pixels.

Figure 7:
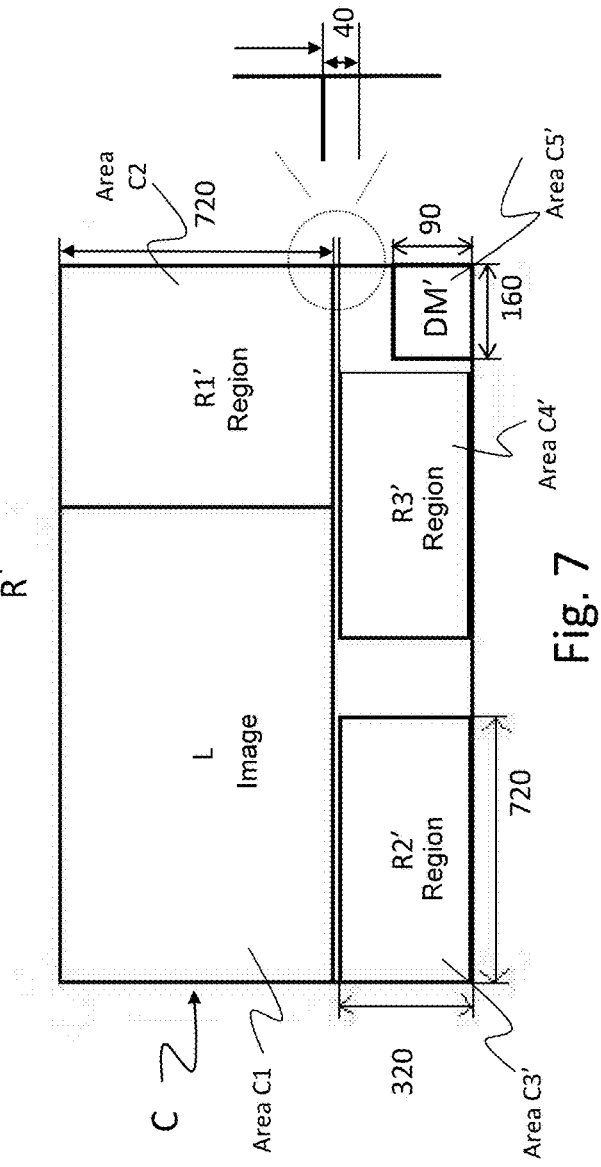
FIG. 7 shows a composite image that includes the image of FIG. 6.

The container frame C can thus be constructed as shown in FIG. 7, with the regions R2' and R3' turned by 90° and arranged in the areas C3' and C4' under the image L and the region R1'.

The regions R2' and R3' thus rotated occupy 720 pixels of 320 rows; therefore, the areas C3' and C4' are separated from the areas C1 and C2 that contain the pixels copied from the image L and from the region R1'.

Preferably, the areas C3' and C4' are separated from the other areas C1 and C2 by at least one safeguard line. In particular, it is advantageous and preferable to copy the pixels of the regions R2' and R3' into the last rows of the container frame C.

Since in this case the container frame is made up of 1080 rows, in the embodiment of FIG. 7 the rotated regions R2' and R3' are separated from the above image L and region R1' by a safeguard strip 40 pixels high.

In the example of FIG. 7, the regions R2' and R3' are separated from each other, so that they are surrounded by pixels of a predefined color (e.g., white or black) not coming from the right and left images. In this manner, the boundary areas between regions containing pixels coming from the right and left images are reduced, while also reducing any artifacts caused by image compression and maximizing the compression rate.

As an alternative to positioning R2' and R3' into the last rows of the container frame C (as described with reference to FIG. 7), in a preferred embodiment R2' and R3' are positioned in a manner such that a safeguard strip 32 pixel rows high is left between the bottom edge of L and the upper edge of R2' and R3'. This provides a second safeguard strip 8 pixel rows high between the bottom edge of R2' and R3' and the bottom edge of C. By further exploiting the width of the container frame, it is possible to position R2' and R3' in a manner such that they get completely surrounded by pixels coming from neither the right image nor the left image.

Finally, in the area C5' in the bottom right corner of the frame C, the depth map (DM') is entered with a resolution of 160×90 pixels, obtained by undersampling the original depth map as previously described. In general, the depth map may have any resolution, as long as it is contained within a free space of the frame C. For better exploiting the available space, the depth map may undergo a rotation and/or disassembly step prior to being entered into the frame C.

Figure 9:
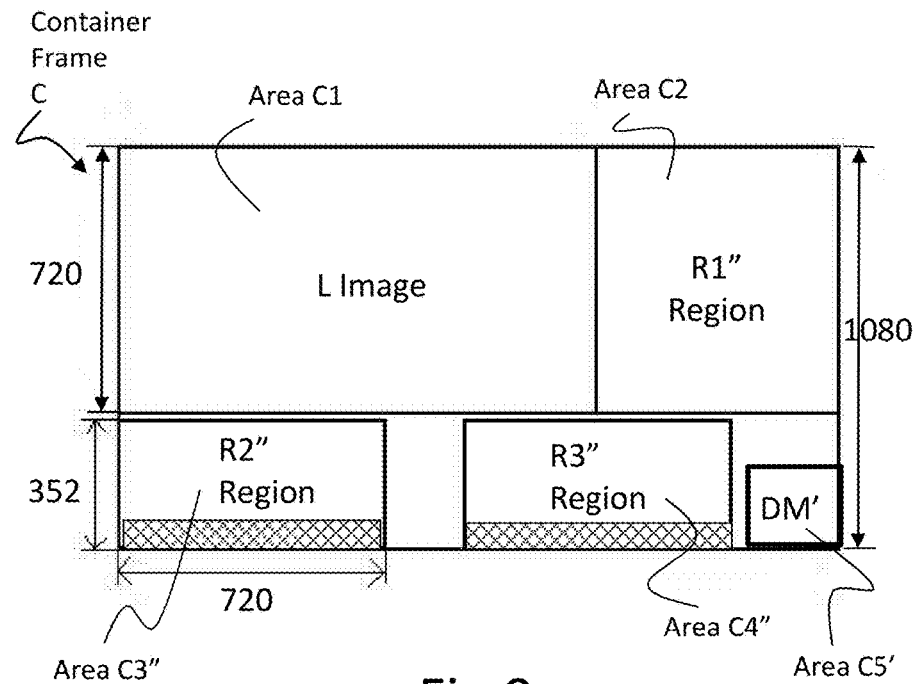
FIG. 9 shows a composite image that includes the image of FIG. 8.
Figure 8:
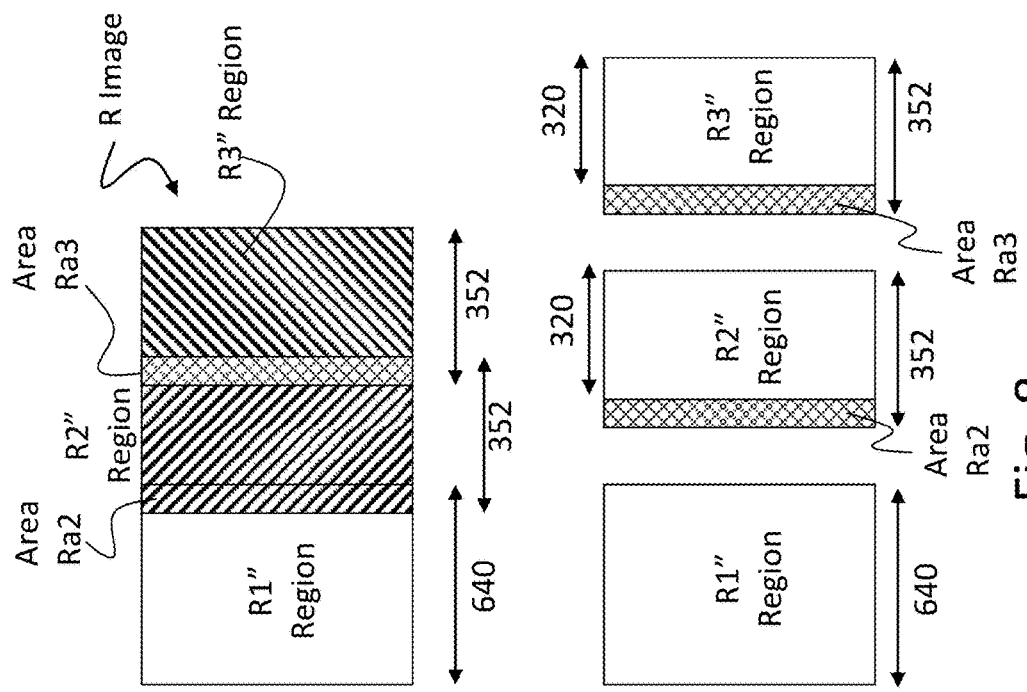
FIG. 8 shows a third form of disassembly of an image to be entered into a composite image.

In a further embodiment, which is described herein with reference to FIGS. 8 and 9, the module 104 extracts three subimages R1", R2" and R3", whose total sum of pixels exceeds that of the disassembled image.

The region R1" corresponds to the region R1' of FIG. 6, whereas R2" and R3" include the area of the regions R2' and R3' plus an additional area (Ra2 and Ra3) which allows to minimize the creation of artifacts during the image compression step.

The segment R1" is thus a region having a size of 640×720 pixels and occupying the first columns of the frame R to be disassembled.

The segment R3" occupies the last columns of the frame R to be disassembled, and borders on the central region R2". R3" includes, on the left side (the one bordering on R2"), a buffer strip Ra3 containing pixels in common with the region R2". In other words, the last columns of R2" and the first ones of R3" (which constitute the buffer strip Ra3) coincide.

Preferably, the size of the buffer strip Ra3 is chosen as a function of the type of compression to be subsequently applied to the container frame C, and in general to the video stream containing it. In particular, said strip has a size which is twice that of the elementary processing unit used in the compression process. For example, the H.264 standard provides for disassembling the image into macroblocks of 16×16 pixels, each of which represents this standard's elementary processing unit. Based on this assumption, the strip Ra3 has a width of 32 pixels. The segment R3" therefore has a size of 352 (320+32)×720 pixels, and comprises the pixels of the last 352 columns of the image R.

The segment R2" occupies the central part of the image R to be disassembled and includes, on its left side, a buffer strip Ra2 having the same size as the strip Ra3. In the example taking into account the H.264 compression standard, the strip Ra2 is thus 32 pixels wide and comprises pixels in common with the region R1". The segment R2" therefore has a size of 352×720 pixels and comprises the pixels of the columns from 608 (640 of R1"−32) to 978 of the frame R.

The three subimages pertaining to the regions R1", R2" and R3" outputted by the module 104 (visible in FIG. 8) are then entered into the container frame C as shown in FIG. 9. The regions R2" and R3" are turned by 90° and the pixels are copied into the last rows of the frame C (areas designated C3" and C4") by providing a certain number of safeguard pixels which separate the areas C3" and C4" from the areas C1 and C2 that include the pixels of the images L and R1". In the case shown in FIG. 9, this safeguard strip is 8 pixels wide.

In this embodiment as well, the depth map (DM') is entered into the area C5' in the bottom right corner of the frame C.

The frame C thus obtained is subsequently compressed and transmitted or saved to a storage medium (e.g., a DVD). For this purpose, compression means are provided which are adapted to compress an image or a video signal, along with means for recording and/or transmitting the compressed image or video signal.

Figures 10, 11:
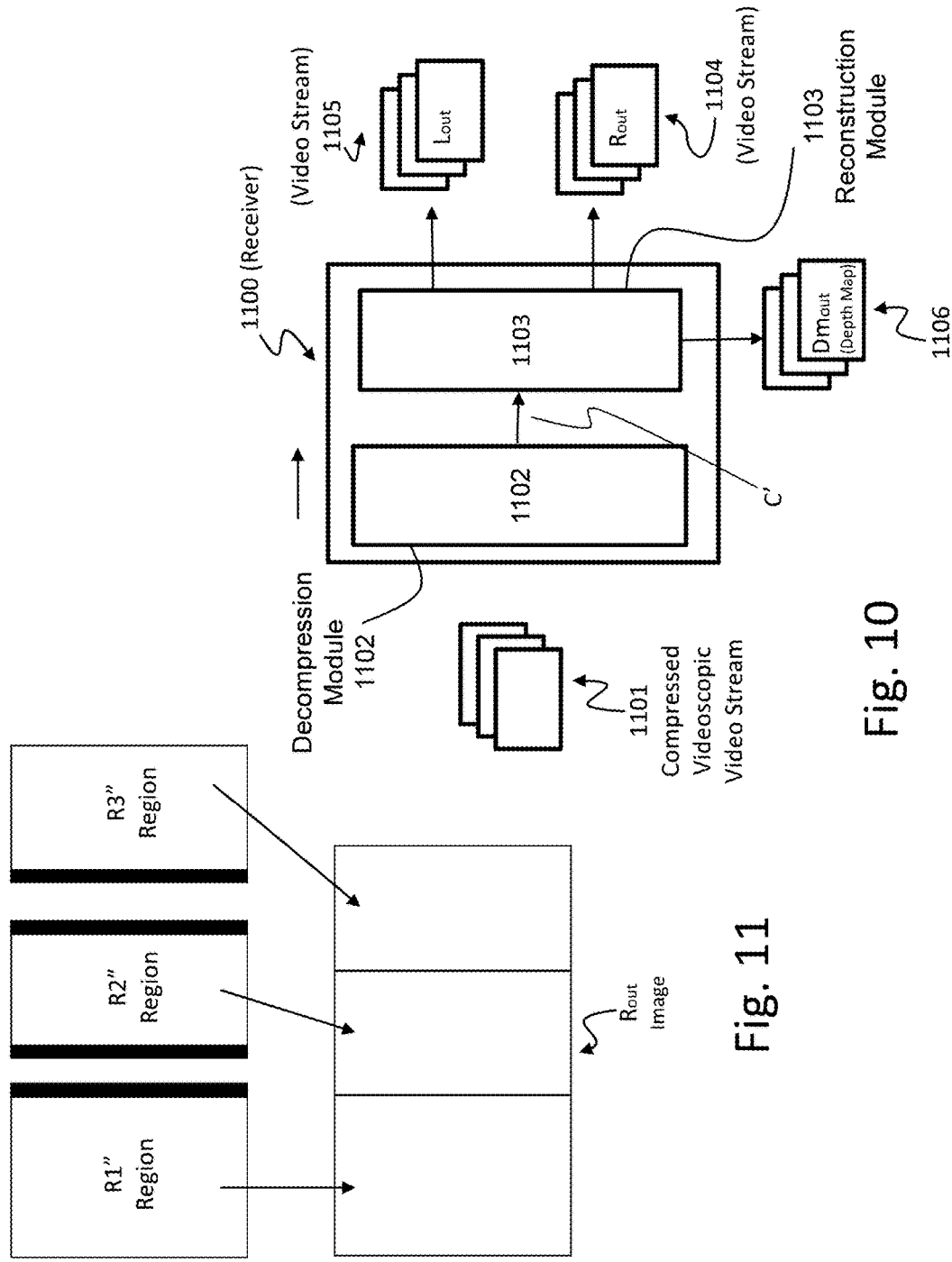
FIG. 10 shows a block diagram of a receiver for receiving a composite image generated according to the method of the present invention.
FIG. 11 shows some steps of reconstructing the image disassembled according to the method of FIG. 8 and entered into the composite image received by the receiver of FIG. 10.

FIG. 10 shows a block diagram of a receiver 1100 which decompresses the container frame (if compressed) received or read from a medium, reconstructs the two right and left images, and makes them available, along with the related depth map, to a display device (e.g., a television set) allowing fruition of 3D contents. The receiver 1100 may be a set-top-box or a receiver built in a television set.

The same remarks made for the receiver 1100 are also applicable to a reader (e.g., a DVD reader) which reads a container frame (possibly compressed) and processes it in order to obtain one pair of frames corresponding to the right and left images entered into the container frame (possibly compressed) read by the reader.

Referring back to FIG. 10, the receiver receives (via cable or antenna) a compressed stereoscopic video stream 1101 and decompresses it by means of a decompression module 1102, thereby obtaining a video stream comprising a sequence of frames C' corresponding to the frames C. If there is an ideal channel or if container frames are being read from a mass memory or a data medium (Blu-ray, CD, DVD), the frames C' correspond to the container frames C carrying the information about the right and left images and the depth map, except for any artifacts introduced by the compression process.

Figure 12:
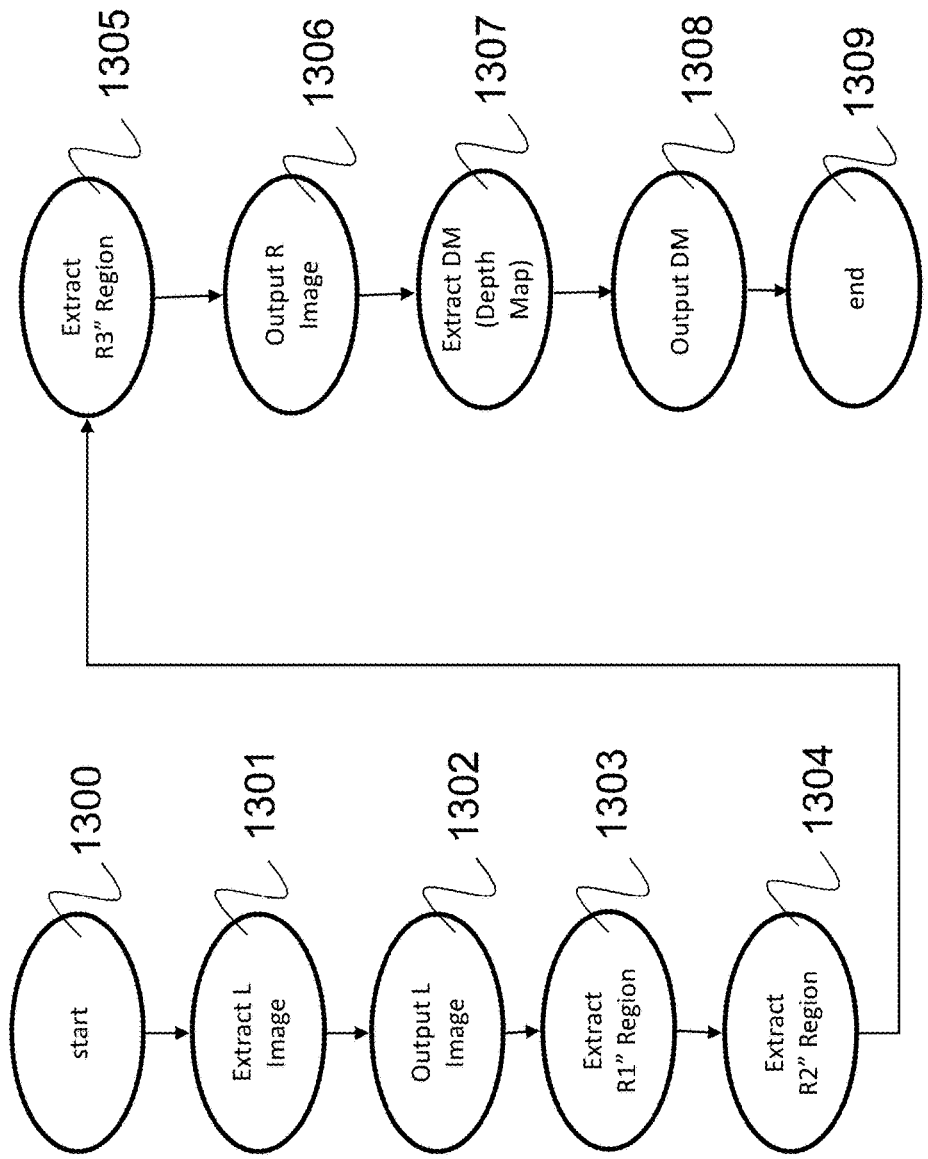
FIG. 12 is a flow chart of a method for reconstructing the right and left images multiplexed into a composite image of the type shown in FIG. 9.

These frames C' are then supplied to a reconstruction module 1103, which executes an image reconstruction and depth map extraction method as described below with reference to FIGS. 11 and 12.

It is apparent that, if the video stream is not compressed, the decompression module 1102 may be omitted and the video signal may be supplied directly to the reconstruction module 1103.

The reconstruction process starts in step 1300, when the decompressed container frame C' is received. The reconstruction module 1103 extracts (step 1301) the left image L by copying the first 720×1080 pixels of the decompressed frame into a new frame which is smaller than the container frame, e.g., a frame of a 720p stream. The image L thus reconstructed is outputted to the receiver 1100 (step 1302).

Subsequently, the method provides for extracting the right image R from the container frame C'.

The step of extracting the right image begins by copying (step 1303) a portion of the area R1" included in the frame C'. More in detail, the pixels of the first 624(640−16) columns of R1" are copied into the corresponding first 624 columns of the new frame representing the reconstructed image Rout, as shown in FIG. 11. As a matter of fact, this removes from the reconstruction step the 16 columns of R1" which are most subject to creation of artifacts, e.g., through the effect of the motion estimation procedure carried out by the H.264 compression standard.

Then a central portion of R2" is extracted (step 1304). From the decompressed frame C' (which, as aforesaid, corresponds to the frame C of FIG. 9), the pixels of the area C3" (corresponding to the source region R2") are selected and a 90° rotation inverse to the one executed in the multiplexer 100 is made, which brings them back to the original row/column condition, i.e., the one shown in FIG. 8. At this point, the first and last sixteen (16) columns of R2" are eliminated and the remaining 352−32=320 pixel columns are copied into the free columns adjacent to those just copied from R1".

By cutting the 16 outermost columns of the region R2", those columns are eliminated where formation of artifacts is most likely to occur. The width of the cut area (in this case 16 columns) depends on the type of compression used. Said area is preferably equal to the elementary processing unit used by the compression process; in the case described herein, the H.264 standard operates upon blocks of 16×16 pixels, and therefore 16 columns are to be cut.

As regards R3" (step 1305), the pixels of the region C4" are extracted from the frame C' and the subimage R3" is brought back to the original row/column format (see FIG. 8). Subsequently, the first 16 pixel columns are eliminated (corresponding to half the area Ra3) and the remaining 352−16=336 pixel columns are copied into the last free columns on the left of the reconstructed frame. Like R2", also in R3" the cut area is equal to the elementary processing unit used by the compression process.

Of course, for both regions R2" and R3" the rotation step may be carried out in a virtual manner, i.e., the same result in terms of extraction of the pixels of interest may be obtained by copying into the reconstructed frame the pixels of a row of the area C3" (if R2", C4" if R3") in a column of the new frame Rout, except for the last 16 rows of the area C3" (if R2", C4" if R3") corresponding to the sixteen columns to be cut, shown in FIG. 8.

At this point, the right image Rout has been fully reconstructed and can be outputted (step 1306).

Finally, the reconstruction module 1103 extracts (step 1307) the depth map DM' by copying into a register the luminance values of the last 160×90 pixels of the decompressed container frame C', corresponding to the area C5'. The content of said register is outputted to the receiver 1100 (step 1308) and will be combined with the three-dimensional content transported by the stereoscopic video stream.

The process for reconstructing the right and left images and the depth map contained in the container frame C' is thus completed (step 1309). Said process is repeated for each frame of the video stream received by the receiver 1100, so that the output will consist of two video streams 1104 and 1105 for the right image and for the left image, respectively, and one data signal deduced from the depth map.

The process for reconstructing the right and left images and the depth map described above with reference to FIGS. 10, 11 and 12 is based upon the assumption that the demultiplexer 1100 knows how the container frame C was built and can thus extract the right and left images and the depth map.

Of course, this is possible if the multiplexing method is standardized.

In order to take into account the fact that the container frame may be generated according to any one of the above-described methods, or anyway according to any one of the methods that utilize the solution which is the subject of the appended claims, the demultiplexer uses the flag information contained in a predefined region of the composite image (e.g., a bar code, as previously described) in order to know how the contents of the composite image must be unpacked and how to reconstruct the right and left images and the depth map.

After decoding the flag, the demultiplexer will know the position of the unchanged image (e.g., the left image in the above-described examples), as well as the positions and any transformations (rotation, translation or the like) of the regions into which the other image was disassembled (e.g., the right image in the above-described examples) and the position of the depth map.

With this information, the demultiplexer can thus extract the unchanged image (e.g., the left image) and the depth map and reconstruct the disassembled image (e.g., the right image).

Although the present invention has been illustrated so far with reference to some preferred and advantageous embodiments, it is clear that it is not limited to said embodiments and that many changes may be made thereto by a man skilled in the art wanting to combine into a composite image two images relating to two different perspectives (right and left) of an object or a scene.

For example, the electronic modules that provide the above-described devices, in particular the device 100 and the receiver 1100, may be variously subdivided and distributed; furthermore, they may be provided in the form of hardware modules or as software algorithms implemented by a processor, in particular a video processor equipped with suitable memory areas for temporarily storing the input frames received. These modules may therefore execute in parallel or in series one or more of the video processing steps of the image multiplexing and demultiplexing methods according to the present invention.

It is also apparent that, although the preferred embodiments refer to multiplexing two 720p video streams into one 1080p video stream, other formats may be used as well, such as, for example, two 640×480 video streams into one 1280× 720 video stream, or two 320×200 video streams into one 640×480 video stream.

Nor is the invention limited to a particular type of arrangement of the composite image, since different solutions for generating the composite image may offer specific advantages.

For example, the embodiments described above with reference to FIGS. 1 to 12 offer the advantage that they only carry out translation or roto-translation operations, thus only requiring little computational power.

Figure 13:
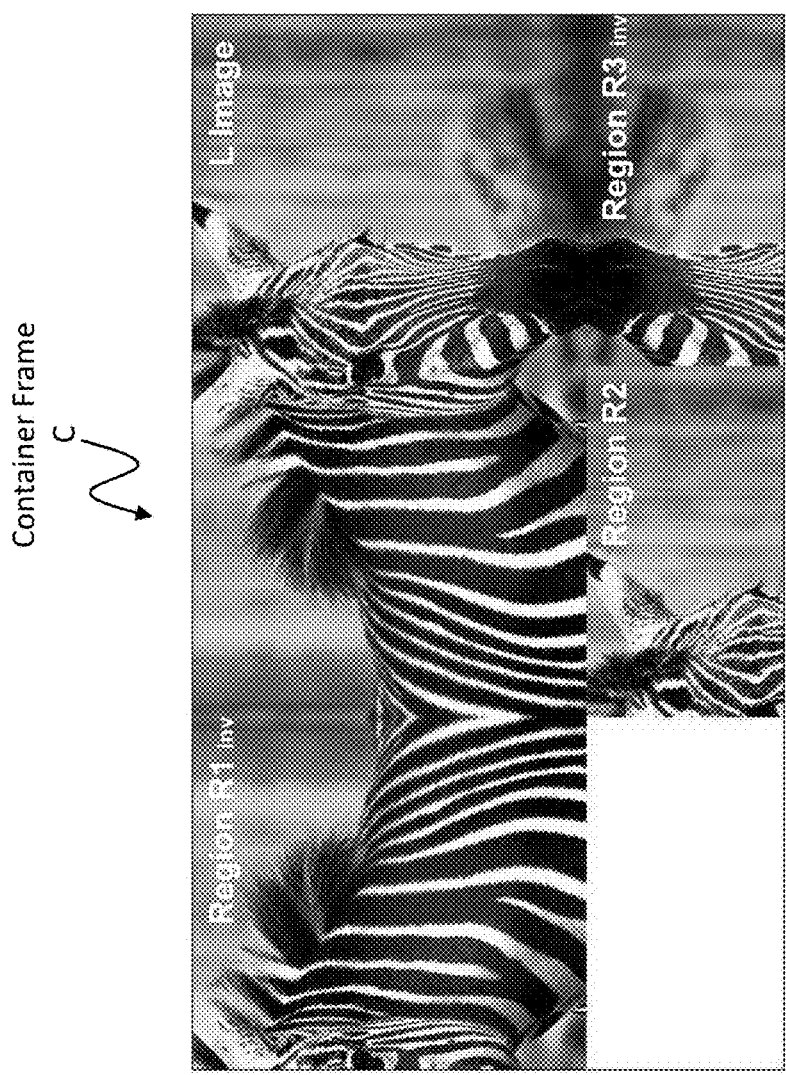
FIG. 13 shows a composite image according to a fourth embodiment of the present invention.

Alternatively, it is conceivable that the images are also subjected to specular inversion steps, in addition to said rotation and/or translation operations, in order to obtain a composite image of the type shown in FIG. 13.

These additional operations are carried out for the purpose of maximizing the boundary perimeters between regions containing homologous pixels, thereby exploiting the strong correlation existing among them and minimizing the artifacts introduced by the subsequent compression step. In the example of FIGS. 13 and 14 it has been assumed for clarity that the two right and left images are identical, even though they generally differ slightly.

In this figure, the left image L (shown in FIG. 14*a*) is positioned in the upper right corner of the container frame C, so as to occupy the last 1280 pixels of the first 720 rows. As in the examples previously described, the image L is thus copied unchanged into the container frame C.

Figure 14A:
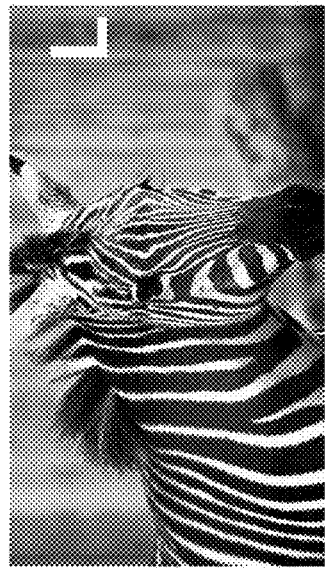
FIGS. 14a to 14f show a right image and a left image in different processing steps carried out for entering them into the composite image of FIG. 13.
Figure 14B:
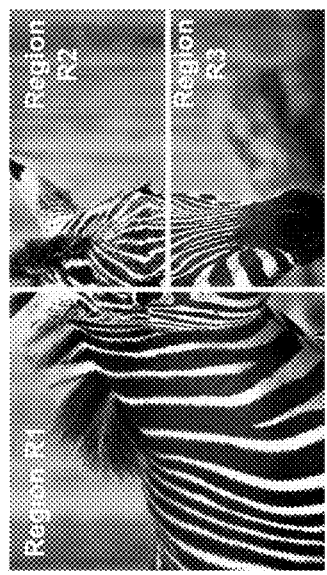

Instead, the right image R is disassembled according to the example of FIG. 3; FIG. 14*b* shows the image R broken up into three regions R1, R2 and R3.

Subsequently, some regions (the regions R1 and R3 in the example of FIG. 14) undergo a specular inversion operation; the inversion may occur relative to a vertical axis (i.e., parallel to a column of the image) or to a horizontal axis (i.e., parallel to a row of the image).

In the case of inversion relative to a vertical axis, the pixels of the column N (where N is an integer between 1 and 1080, 1080 being the number of columns of the image) are copied into the column 1080+1−N.

In the case of inversion relative to a horizontal axis, the pixels of the row M (where M is an integer between 1 and 720, 720 being the number of rows of the image) are copied into the row 720+1−N.

Figure 14C:
Figure 14D:
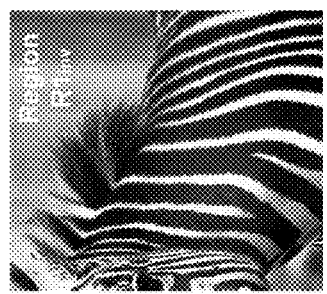

FIGS. 14c and 14d show the region R1 extracted from the image R and inverted (R1rot) relative to a vertical axis, in particular relative to a vertical side.

The inverted region R1inv is entered into the first 640 pixels of the first 640 pixel TOWS.

As can be seen in the example of FIG. 13, when R1inv is entered rotated into the container frame C, the pixels of R1inv bordering on L are very similar to the pixels of L bordering on R1inv. The spatial correlation among these pixels has the advantage of reducing the formation of artifacts.

Figure 14E:
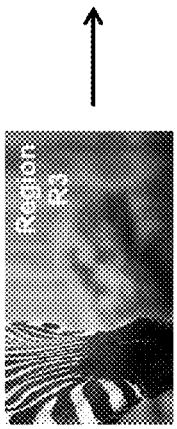
Figure 14F:
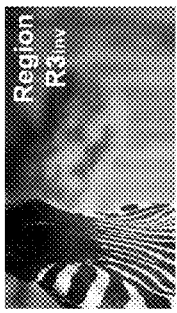

FIGS. 14e and 14f show the region R3 extracted from the image R of FIG. 14b and then inverted (R3inv) relative to a horizontal axis, in particular relative to a horizontal side.

The region R3inv is entered into the last 640 pixels of the last 360 rows. This reduces the generation of artifacts, since the pixels of the boundary regions between R3inv and L are pixels having high spatial correlation. The pixels in this boundary region, in fact, reproduce similar or identical portions of the image.

The container frame C is then completed by entering the region R2.

In this example R2 is not inverted and/or rotated because it would not be possible, in neither case, to match a boundary region of R2 with a boundary region made up of homologous pixels of another region of R or L.

Finally, it is also apparent that the invention also relates to any demultiplexing method which allows a right image and a left image to be extracted from a composite image by reversing one of the above-described multiplexing processes falling within the protection scope of the present invention.

The invention therefore also relates to a method for generating a pair of images starting from a composite image, which comprises the steps of:

generating a first one (e.g., the left image) of said right and left images by copying one single group of contiguous pixels from a region of said composite image, generating a second image (e.g., the right image) by copying other groups of contiguous pixels from different regions of said composite image.

According to one embodiment, the information for generating said second image is extracted from an area of said composite image. Said information is preferably encoded according to a bar code.

In one embodiment of the method for generating the right and left images, the generation of the image which was disassembled in the composite image comprises at least one step of specular inversion of a group of pixels of one of said different regions.

In one embodiment of the method for generating the right and left images, the generation of the image which was disassembled in the composite image comprises at least one step of removing pixels from one of the regions of the composite image that comprise the pixels of this image to be reconstructed. In particular, the pixels are removed from a boundary area of this region.

In one embodiment, the image which was disassembled into different regions of the composite image is reconstructed by subjecting the pixel regions that include the pixels of the image to be disassembled to translation and/or rotation operations only.

Although the above-described embodiment example refers to entering a depth map into a container frame in which either one of the two right and left images is disassembled into several parts, it is clear that the invention is not dependent on the manner in which the two right and left images are formatted within the container frame. For example, the two images may be undersampled and arranged side by side (side-by-side format) or one on top of the other (top-bottom format) in order to leave a free space in the frame wherein the depth map can be placed. Also, either one of the right and left images may be left unchanged, whereas the other one may be undersampled in order to free up space for the depth map.

Finally, it must be remarked that the embodiment examples described above with reference to the annexed drawings relate to a "whole" depth map, i.e., a depth map computed by decimating or filtering a depth map of the 3D content without however subdividing it into several parts, unlike one of the two images L and R, for example. Nevertheless, this is not a limitation of the present invention, and the depth map, once generated (or received), may be entered into the container frame by an encoder, which will break it up into multiple parts that will be arranged in different regions of the container frame. For example, as known, in order to code a stereoscopic content, an H.264 encoder has to enter additional rows which will be cut by the decoder; in one embodiment, the depth map can be entered into these eight additional rows by dividing it, for example, into 240 blocks of 8×8 in size, which when appropriately reassembled will form an image having dimensions proportional to the transported stereoscopic content. One example of block arrangement may be obtained by scanning the rows of a depth map decimated by 16, therefore with a 120×72 resolution, wherein strips of 120×8 pixels are lined up in order to obtain an 1080×8-pixel image. In another embodiment, the same decimated depth map may be subdivided into a greater number of strips 8 pixels high by using a 6-pixel offset instead of an 8-pixel one, so that the content becomes redundant and content protection is promoted at the boundary with the main image. This appears to be particularly advantageous whenever the stereoscopic content includes a pair of right and left images multiplexed into a top-bottom, side-by-side or checkerboard format, with such a resolution as to occupy all the potentially displayable pixels in the frame, e.g., the pixels of a 1920×1080 format.

Preferably, in the event that the frame includes a pair of asymmetrically decimated images (e.g., a side-by-side format wherein the columns are decimated more than the rows, or a top-bottom format wherein only the rows are decimated, not the columns), then the depth map is obtained by decimating a depth map with a row/column decimation ratio proportional to the one used for sampling the images placed in the same frame. By way of example, assuming that a side-by-side format is used for multiplexing the right and left images in the frame, the row/column decimation ratio will be 1:2, since all rows are kept and the columns are decimated by two. In this case, the depth map can be obtained by decimating a depth map with a 1:2 row/column decimation ratio.

It is also clear that different methods may be used for signaling the area occupied by the depth map to the receiver other than those described above, which provide for entering a flag into the image; in fact, such a flag may also be included in a data packet of the signal carrying the video stream.

The invention claimed is:

1. A method for generating a stereoscopic video stream comprising:

receiving left images, right images and depth maps of a tridimensional video content;

forming composite images with a video processor by inserting said left images, said right images and said depth maps into said composite images, wherein each composite image comprises pixels related to an image pair included in the left images and the right images, the image pair including a right image and a left image of the tridimensional video content, wherein said left image and said right image are inserted into the composite image of said stereoscopic video stream without reducing a resolution of said left images and said right images;

for each composite image:
  inserting all the pixels of said right image and all the pixels of said left image in said composite image by leaving one of said two images unaltered and breaking up the other one into regions and entering said regions into corresponding regions of said composite image left free by the insertion of said unaltered image, wherein said composite image has larger dimensions than those necessary to allow the insertion of all pixels of said left and right images, and has the same ratio of horizontal and vertical dimensions of said left and right images, and
  inserting a depth map whose elements correspond to the pixel depth of said tridimensional video content in the pixels of the composite image left free from the insertion of said left and right images; and
  generating, by the video processor, one output video stream comprising the composite images.

2. The method according to claim 1, wherein said regions are obtained through the steps of:
  dividing said other image into two equally sized portions having the same horizontal dimension, and
  dividing one of said two portions into two portions having the same vertical dimension.

3. The method according to claim 1, wherein said regions are inserted into said composite image by means of translation operations only.

4. The method according to claim 1, wherein said image left unaltered is inserted in an area formed by the first 1280 pixels of the first 720 lines of said composite image.

5. The method according to claim 1, wherein one of said regions is inserted into the last 640 pixels of the first 720 lines, side by side with the image left unaltered.

6. The method according to claim 1, wherein two of said regions are inserted below the area occupied by the image left unaltered, occupying respectively the first 640 and the subsequent 640 pixels of the last 360 lines of the composite image.

7. The method according to claim 1, wherein said depth map is coded as a gray scale image, whose informative content is transported by the luminance signal alone, the chrominance signal being null.

8. The method according to claim 1, wherein said depth map has a lower resolution than the resolution of an original version having the same resolution as said left and right images.

9. The method according to claim 8, wherein said depth map is obtained by undersampling said original depth map version 4 to 1.

10. The method according to claim 1, wherein said regions have a rectangular shape.

11. The method according to claim 1, comprising the further step to compress said stereoscopic video stream.

12. A method for reconstructing a pair of left and right images and a depth map starting from a stereoscopic video stream comprising composite frames, wherein each of said composite frames includes pixels related to a right image and a left image of a tridimensional video content received by a stereoscopic video stream generator,
  each composite frame has dimensions larger than those necessary to allow the insertion of all pixels of said left and right images and has the same ratio of horizontal and vertical dimensions as said received left and right images,
  all pixels of said right image and all pixels of said left image are inserted in said composite image by leaving one of said two images unaltered and breaking up the other one into regions entered into corresponding regions of said composite image left free by the insertion of said unaltered image,
  in the pixels of the composite image left free from the insertion of said left and right images, a depth map is inserted, whose elements correspond to a pixel depth of said tridimensional video content,
  the method comprising the steps of:
    receiving said stereoscopic video stream,
    generating, by a video processor, a first one of said right and left images by copying into said generated first image all the pixels of said one first region of said composite image,
    generating, by said video processor, a second image of said right and left images by copying into said generated second image all the pixels of said other regions of said composite image, and
    generating, by said video processor a depth map by copying into said generated depth map the pixels of a further region of said composite image where said depth map is inserted.

13. The method according to claim 12, wherein the generation of said left image and right images involves only translations of said pixel regions.

14. The method according to claim 12, wherein one of said different regions has the same vertical dimension of said first region and half of its horizontal dimension.

15. The method according to claim 12, wherein two of said other regions have the same horizontal dimension of the remaining other region.

16. The method according to claim 12, wherein said further region occupies all pixels non occupied by the first and the other regions.

17. The method according to claim 12, wherein said further region comprises a minor number of pixels than the first region and than at least one of the further regions.

18. The method according to claim 12, wherein said first region is formed by the first 1280 pixels of the first 720 lines of said composite image.

19. The method according to claim 12, wherein one of said other regions is formed by the last 640 pixels of the first 720 lines, side by side with said first region.

20. The method according to claim 12, wherein two of said other regions are placed below said first region, occupying respectively the first 640 and the subsequent 640 pixels of the last 360 lines of the composite image.

21. A device for generating a stereoscopic video stream comprising composite images, each of said composite images comprising pixels related to a right image and a left image of a tridimensional video content, the pixels of said right image and the pixels of said left image being inserted into a composite image of said stereoscopic video stream, wherein the device comprises a first processing unit including a video processor configured to perform:

inserting, by the video processor, all the pixels of said right image and all the pixels of said left image in said composite image by leaving one of said two images unaltered and breaking up the other one into regions, and entering said regions into corresponding regions of said composite image left free by the insertion of said unaltered image, wherein said composite image has larger dimensions than those necessary to allow the insertion of all pixels of said left and right images, and has the same ratio of horizontal and vertical dimensions as said left and right images, and inserting, by said video processor, in the pixels of the composite image left free from the insertion of the right and left image, a depth map, whose elements correspond to a pixel depth of said tridimensional video content, and generating, by said video processor, one output video stream comprising the composite images.

22. The device according to claim 21, wherein said first processing unit obtains said regions by:

dividing said other image into two equally sized portions having the same horizontal dimension, and dividing one of said two portions into two portions having the same vertical dimension.

23. The device according to claim 21, wherein said first processing unit inserts said regions into said composite image by means of translation operations only.

24. The device according to claim 21, wherein said first processing unit inserts said image left unaltered in an area formed by the first 1280 pixels of the first 720 lines of said composite image.

25. The device according to claim 21, wherein said first processing unit inserts one of said regions into the last 640 pixels of the first 720 lines, side by side with the image left unaltered.

26. The device according to claim 21, wherein said first processing unit inserts two of said regions below the area occupied by the image left unaltered, occupying respectively the first 640 and the subsequent 640 pixels of the last 360 lines of the composite image.

27. The device according to claim 21, wherein said first processing unit codes said depth map as a gray scale image, whose informative content is transported by the luminance signal alone, the chrominance signal being null.

28. The device according to claim 21, wherein said depth map has a lower resolution than the resolution of an original version having the same resolution as said left and right images.

29. The device according to claim 28, wherein said first processing unit obtains said depth map by undersampling said original depth map version 4 to 1.

30. The device according to claim 21, wherein said regions have a rectangular shape.

31. The device according to claim 21, comprising a compressing unit of said stereoscopic video stream.

32. A device for reconstructing a pair of left and right images and a depth map by starting from a stereoscopic video stream comprising composite frames, wherein each of said composite frames includes pixels related to a right image and a left image of a tridimensional video content received by a stereoscopic video stream generator, each of said composite frames has dimensions larger than those necessary to allow the insertion of all pixels of said left and right images and has the same ratio of horizontal and vertical dimensions as said received left and right images received by a stereoscopic video stream generator, all the pixels of said right image and all the pixels of said left image being inserted in said composite image by leaving one of said two images unaltered and breaking up the other one into regions entered into corresponding regions of said composite image left free by said unaltered image, in the pixels of the composite image left free from the insertion of said left and right images, a depth map whose elements correspond to the pixel depth of said tridimensional video content is inserted, wherein the device comprises a processing unit including a video processor configured to perform:

receiving said stereoscopic video stream, generating, by said video processor, a first one of said right and left images by copying into said generated first image all the pixels of said one first region of said composite image, generating, by said video processor, a second image of said right and left images by copying into said generated second image all the pixels of said other regions of said composite image, and generating, by said video processor a depth map copying into said generated depth map the pixels of a further region of said composite image where said depth map is inserted.

33. The device according to claim 32, wherein said processing unit generates said left image and right images by only translations of said pixel regions.

34. The device according to claim 32, wherein one of said different regions has the same vertical dimension of said first region and half of its horizontal dimension.

35. The device according to claim 32, wherein two of said other regions have the same horizontal dimension of the remaining other region.

36. The device according to claim 32, wherein said further region occupies all pixels non occupied by the first and the other regions.

37. The device according to claim 32, wherein said further region comprises a minor number of pixels than the first region and than at least one of the further regions.

38. The device according to claim 32, wherein said processing unit forms said first region by the first 1280 pixels of the first 720 lines of said composite image.

39. The device according to claim 32, wherein said processing unit forms one of said other regions by the last 640 pixels of the first 720 lines, side by side with said first region.

40. The device according to claim 32, wherein said second processing unit places two of said other regions below said first region, occupying respectively the first 640 and the subsequent 640 pixels of the last 360 lines of the composite image.

* * * * *